US006270081B2

(12) United States Patent
Onoda et al.

(10) Patent No.: US 6,270,081 B2
(45) Date of Patent: *Aug. 7, 2001

(54) COMBINATION OF PISTON RING FOR USE IN INTERNAL COMBUSTION ENGINE

(75) Inventors: Motonobu Onoda; Takao Sakai, both of Yono (JP)

(73) Assignee: Nippon Piston Ring Co., Ltd., Saitama-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,318

(22) Filed: Jan. 29, 1999

(30) Foreign Application Priority Data

Feb. 13, 1998 (JP) ................................................ 10-048841

(51) Int. Cl.[7] .................................... F16J 9/26; F16J 9/00

(52) U.S. Cl. .......................... 277/442; 277/443; 277/444; 277/447

(58) Field of Search .................................... 277/434, 440, 277/442, 443, 444, 447

(56) References Cited

U.S. PATENT DOCUMENTS 3,281,156 * 10/1966 Mayhew et al. .
3,794,334 * 2/1974 Prasse et al. .
3,938,814 * 2/1976 Cromwell .
4,248,440 * 2/1981 McCormick .......................... 277/224
4,299,401 * 11/1981 McCormick .......................... 277/216
4,344,634 * 8/1982 Onozaki ............................... 277/236
5,582,414 * 12/1996 Miyazaki et al. .................... 277/235
5,601,293 * 2/1997 Fukutome et al. ................... 277/235
5,718,437 * 2/1998 Tanaka et al. .
5,743,536 * 4/1998 Komuro et al. ..................... 277/235
5,820,131 * 10/1998 Tanaka et al. ....................... 277/442
5,960,762 * 10/1999 Imai ................................. 123/193.4

* cited by examiner

*Primary Examiner*—Chuck Y. Mah
*Assistant Examiner*—Vishal Patel
(74) *Attorney, Agent, or Firm*—Sughrue, Mion, Zinn, Macpeak & Seas, PLLC

(57) ABSTRACT

A piston ring combination including at least one compression ring and at least one oil ring. If a plurality of compression rings are provided, an outer peripheral surface of at least a top ring is formed with a first ion plating layer. The oil ring has a pair of side rails whose outer peripheral surfaces are formed with second ion plating layers. These layers are formed of Cr—N mixture. The first ion plating layer has a porous structure with a porosity ranging from 3 to 10% and a hardness ranging from 1000 to 1500 Hv. The second ion plating layer has a dense structure with a porosity ranging from 0 to 3% and a hardness ranging from 1800 to 2200 Hv.

2 Claims, 1 Drawing Sheet

COMBINATION OF PISTON RING FOR USE IN INTERNAL COMBUSTION ENGINE

BACKGROUND OF THE INVENTION

The present invention relates to a combination of piston rings for use in an internal combustion engine, and more particularly, to the combination including at least one compression ring and at least one oil ring.

In accordance with recent requirement in higher engine performance, various machine components of the internal combustion engine are subjected to severe working conditions, and the engine must provide a prolonged durability. Piston rings are operated under higher engine rotation, higher temperature, and higher planner pressure than before, and enhancement of durability is highly required. Further, in accordance with a demand in improvement on engine performance and reduction in engine size, various combination of compression rings and oil rings are provided in an gasoline engine and Diesel engine, such as a combination of three compression rings and two oil rings, a combination of three compression rings and a single oil ring, a combination of a two compression rings and a single oil ring and a combination of a single compression ring and a single oil ring.

In order to improve durability of the piston rings, wear resistant treatment is effected on sliding surfaces of the piston rings such as a high hardness chromium plating and nitriding treatment. However, wear resistance in a conventional piston ring having the chromium plating is still insufficient. On the other hand, the nitriding treatment provides excellent wear resistance, and therefore, the nitriding treatment is becoming popular and is used for a first compression ring or a top ring which suffers from severe working condition since the top ring is positioned closest to a combustion chamber among the piston rings installed on a piston. Still however, the conventional piston ring provided with the nitriding treatment is still insufficient in wear resistance, scuffing resistance, and anti-attacking performance against an opposing component in relative sliding relation to the piston ring.

In order to overcome the above-described problems, laid open Japanese Patent Application Kokai Hei 7-239032 discloses a combination of a plurality of compression rings and at least one oil ring for use in an internal combustion engine. In the combination, an ion plating layer is formed on an outer peripheral sliding surface of a first compression ring and the at least one oil ring. By the formation of the ion plating layer, wear resistance, scuffing resistance, anti-attacking performance against an opposing component and corrosion resistance are improved in comparison with the conventional piston ring combination provided with the nitriding layer. Here, individual development of the surface layer for the compression ring and the oil ring is required in an attempt to further improve wear resistance, scuffing resistance, anti-attacking performance against the opposing component, and corrosion resistance.

SUMMARY OF THE INVENTION

It is therefore an object of the present invention to provide a combination of piston rings for use in an internal combustion engine, the combination being capable of further improving wear resistance, and scuffing resistance, and reducing attacking performance against an opposing component as much as possible.

This and other objects of the present invention will be attained by a combination of a piston rings for use in an internal combustion engine, the piston rings including at least one compression ring including a top ring having an outer peripheral surface formed with a first ion plating layer, and at least one oil ring having an outer peripheral surface formed with a second ion plating layer, the combination comprising the improved first ion plating layer and the second ion plating layer. The first ion plating layer is formed of a mixture of Cr—N and has a porous structure with a porosity ranging from 3 to 10%. The second ion plating layer is formed of a mixture of Cr—N and has a dense structure with a porosity ranging from 0 to 3%.

Preferably, the first ion plating layer has a hardness ranging from 1000 to 1500 Hv, and the second ion playing layer has a hardness ranging from 1800 to 2200 Hv.

In another aspect of the invention, there is provided a combination of a piston rings for use in an internal combustion engine, the piston rings including at least one compression ring including a top ring having an outer peripheral surface formed with a first ion plating layer, and at least one oil ring having an outer peripheral surface formed with a second ion plating layer, the combination comprising the improved first and second ion plating layers. The first ion plating layer is formed of a mixture of Cr—N and has a hardness ranging from 1000 to 1500 Hv. The second ion plating layer is formed of a mixture of Cr—N and has a hardness ranging from 1800 to 2200 Hv.

With this arrangement, the outer sliding layer of the top ring, which undergoes the severest working condition among the piston rings, can provide sufficient wear resistance, scuffing resistance, and a moderate attacking nature against opponent member. Further, cracking of the layer or separation of the layer from the base body of the top ring can be prevented because of the sufficient resiliently restoring force of the layer. Further, the outer sliding layer of at least one oil ring can provide sufficient wear resistance and sufficient oil scraping function. Thus, with the combination of the first and second ion plating layers, enhanced engine performance can result.

DETAILED DESCRIPTION OF THE PREFERRED EMBODIMENTS

Figure 1:
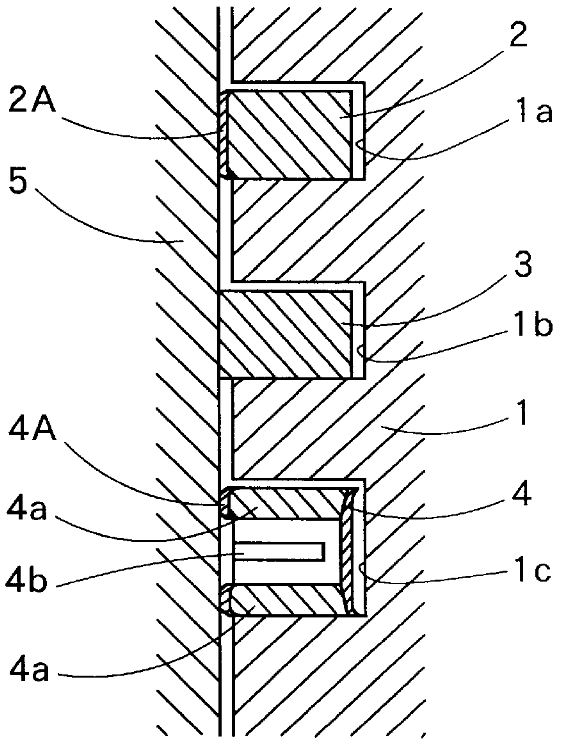
FIG. 1 is a partial cross-sectional view showing a combination of piston rings for use in an internal combustion engine according to a first embodiment of the present invention.

A combination of piston rings according to a first embodiment of the present invention will be described with reference to FIG. 1. A piston 1 has three annular piston ring grooves 1*a*, 1*b*, 1*c*, and a first compression ring 2 (top ring), a second compression ring 3, and an oil ring 4 are assembled in the grooves 1*a*, 1*b*, 1*c*, respectively. The groove 1*a* is positioned closest to a combustion chamber. The oil ring 4 includes a pair of side rails 4*a* and a spacer expander 4*b*.

A base material of the compression rings 2 and 3 is made from a stainless steel (17Cr stainless steel), and a base material of the side rails 4*a* of the oil ring 4 is made from another stainless steel (13Cr stainless steel). Each outer peripheral surface of the rings 2, 3, 4 serves as a sliding surface in sliding contact with a cylinder liner 5.

In the compression rings 2 and 3, the outer sliding surface of at least the top ring 2 is formed with an ion plating layer 2A. Because the top ring 2 is subjected to the hardest frictional wear in the compression rings, the top ring 2 should provide extremely high performance in terms of wear resistance, scuffing resistance and anti-attacking property against the opponent member such as a cylinder liner. The ion plating layer is formed from a Cr—N mixture, and has a porous structure having a porosity ranging from 3 to 10%, with a hardness ranging from 1000 to 1500 Hv. Cr—N mixture as a material of the plating layer 2A is satisfactory in both wear resistance and cracking resistance. Cr—N is a mixture of compositions of CrN and $Cr_2N$. The porous structure can improve resiliently restoring force of the layer 2A in order to avoid cracking of the layer 2A due to repeated deformation of the top ring 2 incurred by the engine rotation. If the porosity is less than 3%, resiliently restoring force is insufficient. On the other hand, if the porosity exceeds 10%, cracking resistance of the layer 2A may be reduced, and the layer 2A may be easily peeled off from the top ring body (hereinafter, simply referred to as "peeling resistance" may be lowered). If the hardness of the layer 2A is less than 1000 Hv, sufficient wear resistance may not be provided, and if the hardness exceeds 1500 Hv, cracking resistance may be lowered and attacking property against opposing sliding component may be increased.

Turning to the oil ring 4, oil scraping function may be lowered and oil leakage into the combustion chamber may be increased, if outer peripheral surfaces of the side rails 4*a* are frictionally worn. Therefore, consumption of lubrication oil may be increased, and combustion mode may be degraded. In this connection, the outer peripheral surfaces of the side rails 4*a* are also formed with ion plating layers 4A. The ion plating layer 4A is formed from a Cr—N mixture, and has a dense structure having a porosity ranging from 0 to 3%, with a hardness ranging from 1800 to 2200 Hv. Cr—N mixture as a material of the plating layer 4A is satisfactory in both wear resistance and cracking resistance. The dense structure can ensure sufficient wear resistance of the layer 4A. Since the planner pressure to the oil ring is lower than that to the top ring, attention is drawn to the wear resistance rather than resiliently restoring force. If the porosity exceeds 3%, wear resistance may be reduced. If the hardness of the layer 4A is less than 1800 Hv, sufficient wear resistance may not be provided, and if the hardness exceeds 2200 Hv, cracking resistance and peeling resistance may be lowered and attacking property against opposing sliding component may be increased.

Figure 2:
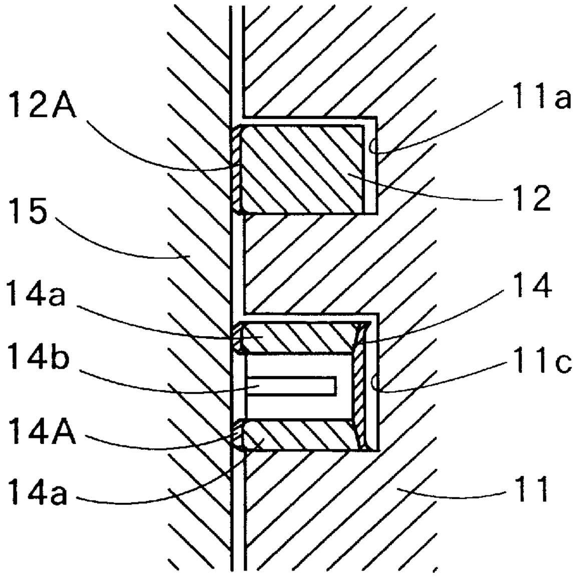
FIG. 2 is a partial cross-sectional view showing a combination of piston rings according to a second embodiment of the present invention.

FIG. 2 shows a combination of piston rings according to a second embodiment of the present invention. The second embodiment pertains to a size reduction of a piston 11 with a combination including a single compression ring 12 and a single oil ring 14, thereby realizing a compact engine. The piston 11 is formed with two annular grooves 11*a*, 11*c*, and the compression ring 12, which is a top ring, is assembled in the groove 11*a* positioned closer to a combustion chamber than is the groove 11*c*. The outer sliding surfaces of these rings 12 and 14 are in sliding contact with a cylinder liner 15. An ion plating layer 12A is formed on an outer peripheral surface of the compression ring 12 for serving as a sliding layer, and another ion plating layers 14A are formed on outer peripheral surface of the side rails 14*a* of the oil ring 14, these layers 12A and 14A corresponding to the layers 2A and 4A of the first embodiment, respectively.

In both the first and second embodiments, the ion plating layers 2A, 4A, 12A, 14A are formed by a conventional reactive ion plating method, which is a surface treatment technique, in which Cr metal is vaporized and ionized in a gaseous phase in a reaction gas such as N, and a reacted material (CrN) caused by the reaction between the N gas and vaporized Cr ion is deposited on a surface of a base body negatively biased.

While the invention has been described in detail and with reference to the specific embodiments thereof, it would be apparent to those skilled in the art that various changes and modifications may be made therein without departing from the spirit and scope of the invention. For example, as a modification to the first embodiment, a combination including three compression rings and two oil rings may be conceivable. In this case, outer peripheral surfaces of at least a first compression ring (top ring) and a first oil ring are respectively formed with the ion plating layer. Further, a combination including three compression ring and a single oil ring may be conceivable. In this case also, outer peripheral surfaces of at least a first compression ring (top ring) and the oil ring are respectively formed with the ion plating layer.

What is claimed is:

1. A combination of a piston rings for use in an internal combustion engine, the piston rings including at least one compression ring including a top ring having an outer peripheral surface formed with a first ion plating layer, and at least one oil ring having an outer peripheral surface formed with a second ion plating layer, the combination comprising:

the first ion plating layer being formed of a mixture of Cr—N and having a porous structure with a first porosity ranging from 3 to 10%, and the second ion plating layer being formed of a mixture of Cr—N and having a dense structure with a second porosity ranging from 0 to 3%, wherein the first porosity and the second porosity are different.

2. The combination of claim 1, wherein the first ion plating layer has a hardness ranging from 1000 to 1500 Hv, and wherein the second ion plating layer has a hardness ranging from 1800 to 2200 Hv.

* * * * *